United States Patent [19]

Hathaway et al.

[11] Patent Number: 4,812,907
[45] Date of Patent: Mar. 14, 1989

[54] SYNC PULSE SEPARATOR SYSTEM

[75] Inventors: Roger C. Hathaway, Franklin Park; Gopal K. Srivastava, Arlington Heights, both of Ill.

[73] Assignee: Zenith Electronics Corporation, Glenview, Ill.

[21] Appl. No.: 140,001

[22] Filed: Dec. 31, 1987

[51] Int. Cl.$^4$ .............................................. H04N 5/08
[52] U.S. Cl. ................................... 358/153; 358/148; 328/115; 328/139
[58] Field of Search ............... 358/148, 150, 154, 155, 358/156, 157; 328/108, 115, 133, 135, 139

[56] References Cited
U.S. PATENT DOCUMENTS 3,706,847 12/1972 Smeulers .............................. 358/153
4,621,289 11/1986 Bart et al. ............................ 358/153
4,697,211 9/1987 Balaban et al. ...................... 358/153

Primary Examiner—James J. Groody
Assistant Examiner—Michael D. Parker

[57] ABSTRACT

A method and apparatus for separating sync pulses by charging a capacitor to the sync tip voltage level during occurrence of a sync pulse and discharging the capacitor to the back porch voltage level for an equal duration. The discharge duration is determined by decrementing an up/down counter that was incremented during the sync pulse. A comparator separates the sync pulses by comparing the composite video signal with the voltage on the capacitor.

11 Claims, 1 Drawing Sheet

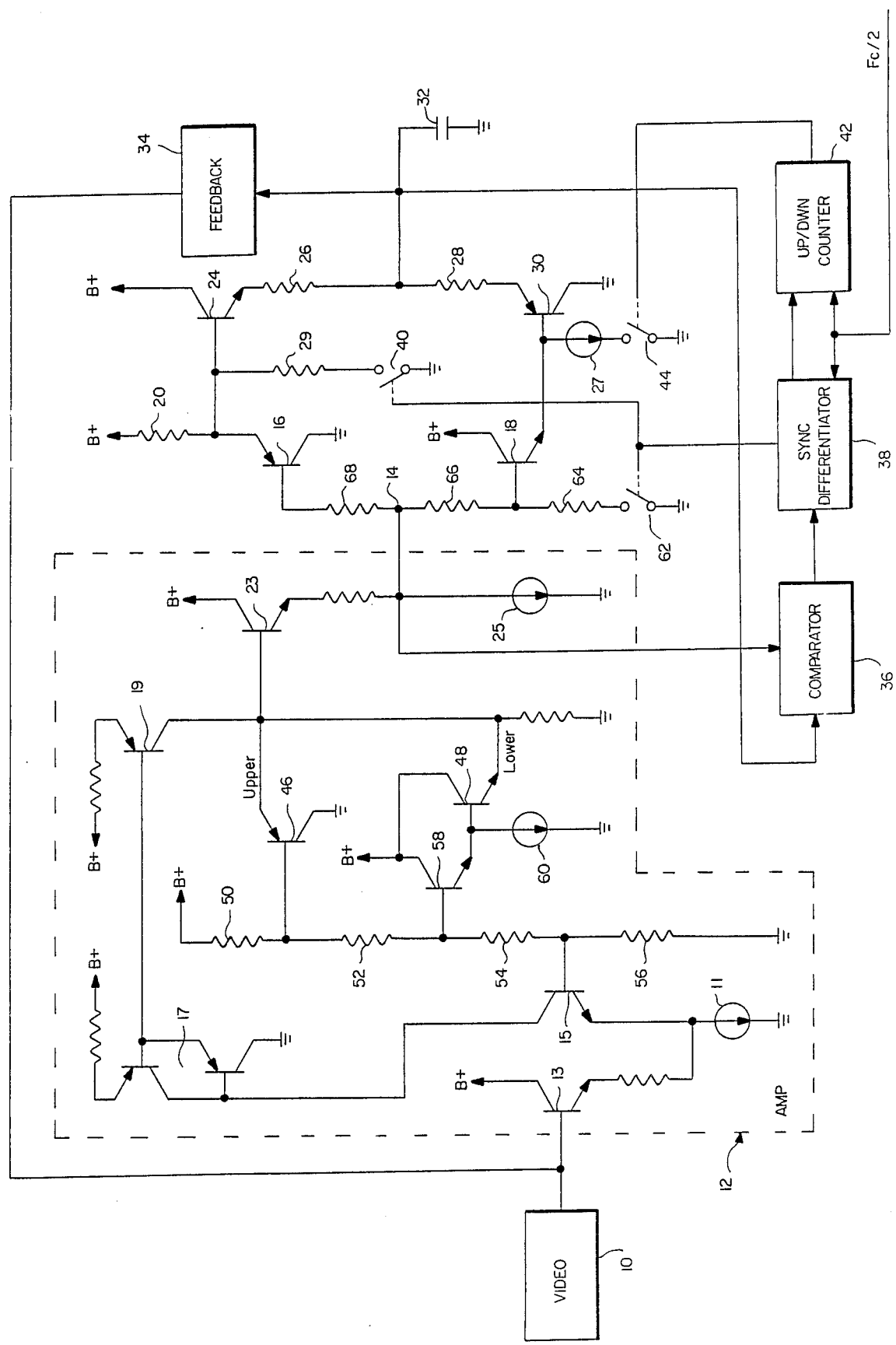

4,812,907

SYNC PULSE SEPARATOR SYSTEM

BACKGROUND OF THE INVENTION AND PRIOR ART

This invention relates generally to television signal sync pulse separators and particularly to sync separators capable of operating reliably with non-standard sync signals.

The standard NTSC television signal has a very precisely defined relationship between the level of the tip of the sync pulse and the level of the back porch upon which the sync pulse and color burst ride. The relationship between the sync and video is also prescribed. There are many circuits and techniques available for separating sync from a composite video signal. A commonly used one develops a DC voltage by integrating the sync pulse over the duration of the horizontal line. The DC voltage is used as a reference to a comparator which separates sync pulses from the composite video signal by comparing the composite video with the DC voltage level. This system thus "slices" the sync pulse at a level between sync tip level and back porch level, the slice level being determined by the charge and discharge characteristics of the integrating network. Slicing of the sync pulse is desirable to obtain "clean" sync, e.g., pulses that are free from noise and that are not mistakenly based upon noise impulses.

With the advent of television cable systems and video cassette recorders (VCRs), the relationship of sync to video and of the sync tip level to the back porch level, as well as the width of the sync pulses often vary due to transmission equipment that may not fully comply with NTSC broadcast standards for over-the-air transmissions. It should be noted that television signals produced in cable systems and in VCRs need not conform in all respects to NTSC standards. The result is that many television signals have sync pulses of varying widths and sync pulses that are "crushed" with respect to video portions of the signal. Recovery of such sync pulses using prior art techniques is difficult at best and impossible in many situations. In prior art systems, where the sync is integrated over a complete horizontal line, for example, crushed sync may result in a slice level such that the video and noise are detected as sync, which is unacceptable. With the invention, the slice level of the sync pulse is maintained at its predetermined percentage of sync height (sync tip minus back porch) despite changes in the width of the sync pulse or changes in relative amplitude between sync tip level and video.

OBJECTS OF THE INVENTION

A principal object of the invention is to provide an improved sync signal separator and method.

Another object of the invention is to provide a sync signal separator and method that reliably separates sync pulses that are crushed or of non-standard duration.

BRIEF DESCRIPTION OF THE DRAWING

These and other objects and advantages of the invention will be apparent upon reading the following description in conjunction with the drawing, the single FIGURE of which is a partial schematic diagram of a sync separator constructed and operated in accordance with the inventive method.

DESCRIPTION OF THE PREFERRED EMBODIMENT

Referring to the single FIGURE, a video source 10 supplies a composite video signal to an amplifier 12 (indicated by the dashed line box) for producing an amplified inverted version thereof at a junction 14. A current source 11 is coupled to a differential amplifier consisting of a pair of transistors 13 and 15. The video signal is applied to the base of transistor 13. Transistor 15 is supplied by a current mirror including transistor pair 17 and transistor 19 the collector of which includes a load resistor 21, across which the video signal is developed. A level shifting arrangement comprising a transistor 23 and a current source 25 is connected to junction 14 and adjusts the signal level from that appearing across resistor 21. Junction 14 is connected to the bases of a PNP transistor 16 and an NPN transistor 18 through resistors 68 and 66 respectively and to one input of a comparator 36. Transistor 16 has its collector connected to ground and its emitter connected through a resistor 20 to a source of B+. Transistor 18 has its collector connected to B+ and its emitter connected to ground through a current source 27 that is connected to ground through a switch 44. The base of transistor 18 is connected to ground through a resistor 64 and a switch 62. The emitter of transistor 16 is connected to the base of an NPN transistor 24 and the emitter of transistor 18 is connected to the base of a PNP transistor 30. The collector of transistor 24 is connected to B+ and its emitter is connected through a resistor 26 to a filter capacitor 32. The collector of transistor 30 is connected to ground and its emitter is connected through a resistor 28 to filter capacitor 32. The base of transistor 24 is connectable through a resistor 29 to ground by means of a switch 40 and the base of transistor 30 is connectable to ground through current source 27 by means of a switch 44. Switch 40 is operated under control of a sync differentiator 38 and the switched current source 27 is operated under control of an up/down counter 42. Composite sync is developed at the output of comparator 36 and applied to the input of sync differentiator 38 which, in turn, controls operation of up/down counter 42. Both sync differentiator 38 and up/down counter 42 are driven by a clock signal of Fc/2 where Fc is equal to the frequency of the color carrier, e.g., 3.58 MHz. As will be seen, switches 40 and 44 are operated selectively to define charge and discharge cycles for filter capacitor 32.

Filter capacitor 32 is also connected to the other input of comparator 36 and to a feedback circuit 34, the output of which is supplied back to the input of amplifier 12. Feedback circuit 34 is used to DC stabilize the circuit.

A pair of limit circuits labelled lower and upper are provided. The lower limit circuit comprises a pair of NPN transistors 48 and 58 and a current source 60. The upper limit circuit comprises a PNP transistor 46. The bases of transistors 46 and 58 are supplied by a voltage divider consisting of series connected resistors 50, 52, 54 and 56 connected between B+ and ground. The base of transistor 46 is connected to the junction of resistors 50 and 52 and the base of transistor 58 is connected to the junction of resistors 52 and 54. The junction of resistors 54 and 56 supplies the base of differential amplifier transistor 15. The emitter of transistor 58 is connected to the base of transistor 48 and to current source 60. The collectors of transistors 48 and 58 are connected to B+.

The resistors in the voltage divider are selected such that the potential at junction 14 is confined between an upper and lower level. Thus the composite video signal within amplifier 12 is limited in its positive and negative excursions by the limit circuits. This precludes the sync separator circuit from being adversely affected by excessively strong signals and noise and from being subjected to erroneous operation on weak signals or signals with very high back porch levels.

In operation, sync differentiator 38 functions to open switch 40 for a time window beginning about 25 microseconds before the leading edge of a sync pulse and ending about 2 microseconds after the trailing edge of the sync pulse. The sync differentiator 38 also sends a positive-going start pulse to up/down counter 42 in time coincidence with the leading edge of the sync pulse, which begins to count up from zero at an Fc/2 rate. The opening of normally closed switch 40 enables conduction in transistor 16 and transistor 24 and consequent charging of filter capacitor 32 during the period that the switch is open. Switch 40 is therefore open during occurrence of the sync pulse and thus the sync tip voltage level is applied to the base of transistor 24 by transistor 16. The positive-going composite sync signal at the base of transistor 16 results in a similar positive-going signal at the base of transistor 24. Thus when switch 40 opens, a charge path for filter capacitor 32 is established from B+ through the emitter-collector junction of transistor 24 and resistor 26. Thus filter capacitor 32 is charged towards sync tip level.

As mentioned, up/down counter 42 commences to count at the leading edge of the sync pulse. When the trailing edge of the sync pulse occurs, the voltage at the base of transistor 24 goes lower than the voltage of filter capacitor 32, causing transistor 24 to reverse bias and cease charging filter capacitor 32. However, if the sync pulse width is wider than a predetermined width, the charging of filter capacitor 32 ceases due to the sync differentiator 38 closing the switch 40. Sync differentiator 38 sends a negative-going pulse to up/down counter 42 at the trailing edge of the sync pulse or at the end of the window, whichever occurs first, causing the counter to close switch 44 and to commence counting down at an Fc/2 rate. Activating switch 44 enables transistor 18 and transistor 30 at the time when the back porch level of the composite video signal is normally present at the base of transistor 18. The base of transistor 30 receives the back porch level signal from the emitter of transistor 18 which has the positive-going composite video si gnal on its base. Transistors 18 and 30 are driven conductive and a discharge path is established from filter capacitor 32 through resistor 28 through the emitter-collector circuit of transistor 30 to ground. Discharge occurs until counter 42 has counted down to zero, at which time it operates to open switch 44 and terminate discharge of capacitor 32. The arrangement provides for a precise equalization of the charge and discharge time periods. The slice level voltage, i.e., the voltage developed on capacitor 32 is thus a function of the ratio of resistors 26 and 28 and the sync tip and back porch voltage levels. If the resistors are equal, the slice level voltage will be midway between sync tip voltage level and back porch level since the charge and discharge times for capacitor 32 are also equal. Consequently, with the circuit arrangement of the invention, filter capacitor 32 is permitted to charge to sync tip voltage level for the duration of the sync pulse, which time period is measured. Thereafter, filter capacitor 32 is permitted to discharge to the back porch voltage level for an equivalent time period.

It will be apparent to those skilled in the art that the circuit of the invention is not adversely affected by sync pulses that are narrower or wider than normal or by sync pulses that are crushed, that is, where the ratio of the sync tip voltage level to the back porch voltage level is reduced. Rather, the circuit will find the level between the actual sync tip level and back porch level.

While the described circuit solves the problems of the prior art with respect to crushed and non-standard sync signals, the upper and lower limit circuits have been included to guard against excessively strong signals and signals where the back porch may be missing for some reason. This is accomplished by establishing a restricted voltage range for the composite video signal at junction 14. Should the composite video signal rise above a predetermined maximum level, transistor 46 is driven conductive and should the composite video signal drop below a predetermined minimum level, transistor 48 is driven conductive. Thus these transistors function to maintain the video signal at junction 14 within prescribed voltage limits. As mentioned, the feedback circuit 34 is incorporated for stabilizing the DC operating levels of the circuit.

Finally, during the vertical interval, the sync differentiator 38 activates switch 62 which results in the level of the video signal present at the base of transistor 18 being a function of the ratio of resistor 64 and 66. This video signal level ratio establishes an artificial back porch when vertical sync pulses are present.

What has been described in a novel system for reliably separating sync pulses from composite video television signals. It is recognized that numerous changes in the described embodiment of the invention will be apparent to those skilled in the art without departing from its spirit and scope. The invention is to be limited only as defined in the claims.

What is claimed is:

1. A sync separator comprising:
    a source of composite video signal including sync pulses having a sync tip voltage level and a back porch voltage level;
    means establishing a voltage level intermediate said sync tip voltage level and said back porch voltage level;
    said establishing means comprising means for charging a capacitor for the duration of a sync pulse to said sync tip voltage level and means for discharging said capacitor for an equal time period after said sync pulse to said back porch voltage level; and
    comparator means for separating sync pulses from said composite video signal based upon their relationship to said established voltage level.

2. The combination of claim 1, further including up/down counter means and sync differentiator means for operating said counter means to count to one direction responsive to the leading edge of a sync pulse and for operating said counter means, to count in the opposite direction responsive to the trailing edge of said sync pulse; and
    wherein said sync differentiator means controls said charging means and said up/down counter means controls said discharging means.

3. The combination of claim 2, further including a first transistor in said charging means and a second transistor in said discharging means.

4. The combination of claim 3, further including means for maintaining said composite video signal within predetermined voltage limits.

5. A synchronizing signal separator comprising:
a source of composite video signal including sync pulses having a sync tip voltage level and a back porch voltage level;
a filter capacitor;
first transistor means for charging said filter capacitor for the duration of a sync pulse to said sync tip voltage level;
second transistor means for discharging said filter capacitor for a time period equal to the duration of said sync pulse to said back porch voltage level;
a sync pulse differentiator for operating said first transistor means;
means, including comparator means coupled between said filter capacitor and said source of composite video signal, for supplying said sync pulse differentiator with separated sync pulses;
an up/down counter coupled to said sync pulse differentiator; and
said up/down counter counting up for the duration of said sync pulse and counting down immediately after said sync pulse and operating said second transistor means when counting down.

6. A method of separating sync pulses having a sync tip voltage level and a back porch voltage level from a composite video signal comprising the steps of:
charging a capacitor for a first time period, equal to a sync pulse duration, toward the sync tip voltage level;
discharging the capacitor for a second time period, equal to said first time period, toward the back porch voltage level; and
comparing the composite video signal and the voltage across the capacitor to develop separated sync pulses.

7. The method of claim 6 wherein an up/down counter is incremented at the beginning of the sync pulse and decremented at the end of the sync pulse, the duration of the second time period being determined by decrementing the up/down counter.

8. The method of claim 7 wherein charging and discharging of said capacitor are accomplished by switching current source and current sink transistors responsive to the occurrence of a sync pulse and decrementing of the up/down counter, respectively.

9. The method of claim 8, wherein upper and lower voltage limits are established for said composite video signal.

10. A method of separating horizontal sync pulses having a sync tip voltage level and a back porch voltage level from a composite video signal comprising the steps of:
operating a transistor current source to charge a filter capacitor toward the sync tip voltage level for the duration of the sync pulse;
incrementing a counter to develop a count corresponding to the duration of the sync pulse;
operating a transistor current sink for discharging the filter capacitor to the back porch voltage level during decrementing of the counter; and
comparing the composite video signal with the voltage across the filter capacitor to develop separated sync pulses.

11. The method of claim 10, wherein an intermediate back porch level is established during vertical synchronization pulses.

* * * * *